United States Patent [19]
Bernstein

[11] Patent Number: 5,907,548
[45] Date of Patent: May 25, 1999

[54] TELEPHONE NETWORK LOCAL ACCESS USING DATA MESSAGING

[75] Inventor: Lawrence Bernstein, Short Hills, N.J.

[73] Assignee: Lucent Technologies Inc., Murray Hill, N.J.

[21] Appl. No.: 08/579,689

[22] Filed: Dec. 28, 1995

[51] Int. Cl.$^6$ ............................ H04J 3/26; H04M 11/00
[52] U.S. Cl. .................... 370/353; 370/463; 379/93.01
[58] Field of Search ................................ 370/353, 395, 370/398, 463, 465, 474, 476; 379/93.01, 207

[56] References Cited

U.S. PATENT DOCUMENTS

| | | | |
|---|---|---|---|
| 5,138,657 | 8/1992 | Colton et al. ............................ | 379/220 |
| 5,381,405 | 1/1995 | Daugherty et al. ...................... | 370/355 |
| 5,386,417 | 1/1995 | Daugherty et al. ...................... | 370/352 |
| 5,390,169 | 2/1995 | Bernstein ................................ | 370/399 |
| 5,392,277 | 2/1995 | Bernstein ................................ | 370/399 |
| 5,610,910 | 3/1997 | Focsaneanu et al. ................... | 370/401 |

*Primary Examiner*—Melvin Marcelo
*Attorney, Agent, or Firm*—Jeffery J. Brosemer

[57] ABSTRACT

The interface between a telephone station device and a telecommunications system/network is digitized at a point at which a telephone call is originated such that signals generated by the device and other intelligence, e.g., voice or data signals, are formed into respective data packets. The data packets are then sent to the telecommunications system/network via a data network as they are so formed. Similarly, the intelligence contained in data packets received from the telecommunications system and destined for the telephone station device is converted into a form acceptable to the telephone station device.

10 Claims, 10 Drawing Sheets

| LOCATION | TERMINAL DEVICE ($\widehat{OE}_i$) | RTI DIRECTORY NUMBER | SERVER DIRECTORY NUMBER | APPL. | ROUTE TO/ INCOMING | ROUTE TO/ OUTGOING | FX | E911 SERVER | WIRETAP ? |
|---|---|---|---|---|---|---|---|---|---|
| 11-1 | 11-11 | 908-949-6111 | 908-615-1236 | VIDEO | COLL 520 | VID. SW 55 | — | — | — |
|  | 11-12 | 908-949-6111 | 908-949-6111 | POTS | CO. SW 45 | CO. SW 45 | — | — | — |
|  | 11-14 | 908-949-6111 | 908-957-8823 | DATA | COLL 820 | COLL 820 | — | — | — |
| 11-2 | 11-21 | 908-949-7222 | 908-834-0166 | VIDEO | VID. SW 65 | COLL 620 | — | — | — |
|  | 11-22 | 908-949-7222 | 908-949-7222 | POTS | CO. SW 45 | CO. SW 45 | — | CO. SW 45 | — |
|  | 11-23 | 908-582-7678 | 908-582-7678 | ISDN | — | CO. SW 75 | — | — | — |
| 11-N | 11-N2 | 908-949-8333 | 908-949-8333 | POTS | CO. SW 45 | CO. SW 45 | — | — | 908-555-8282 |
|  | ----- | ----- | ----- | ----- | ----- | ----- | ----- | ----- | ----- |

FIG. 6

NUMBER TRANSLATION TABLE OF RTI FACILITY 70

| LOCATION | TERMINAL DEVICE ($OE_i$) | RTI DIRECTORY NUMBER | SERVER DIRECTORY NUMBER | APPLICATION | ROUTE TO/ INCOMING | ROUTE TO/ OUTGOING | FX | E911 SERVER | WIRETAP ? |
|---|---|---|---|---|---|---|---|---|---|
| ---- | ---- | ---- | ---- | ---- | ---- | ---- | ---- | ---- | ---- |
| 11-2 | 11-23 | 908-582-7678 | 908-582-7678 | ISDN | CO SW 75 | — | DIST410/D | — | — |
| ---------- | ---------- | ---------- | ---------- | ---------- | ---------- | ---------- | ---------- | ---------- | ---------- |

TELEPHONE NETWORK LOCAL ACCESS USING DATA MESSAGING

FIELD OF THE INVENTION

The present invention relates to telecommunications systems.

BACKGROUND OF THE INVENTION

For most of its history, telecommunications was limited to the provision of a single telecommunications "application"—so-called plain old telephone service, or POTS. Within the last thirty years or so, however, a wide array of new telecommunications applications have been introduced with yet others being planned for implementation within this decade and beyond. Thus the range of current and future telecommunications applications includes not only POTS, but facsimile, cash machine and lottery telecommunications applications, access to computers, video to the home, and telephone-network-based games, as well as a variety of features that can be implemented for various of the telecommunications applications, such as call waiting, calling number ID, and speed calling.

The aforementioned and other telecommunications applications are realized by such telecommunications "services" as basic voiceband switching, packet switching, message switching, frame relay, SMDS and call switching (such as the so-called asynchronous transfer mode, or ATM).

It is a straightforward matter to provide a subscriber location with access to different telecommunications applications by assigning to that location directory numbers supported by each of a plurality of so-called intelligent network element (INE) servers capable of supporting respective telecommunications applications. The telecommunications network's numbering plan will thereby cause calls directed to those various directory numbers to be routed to the appropriate INE server and, thence, to the appropriate terminal device, e.g., POTS telephone set, cash machine, video terminal or personal computer, at the subscriber location.

SUMMARY OF THE INVENTION

I have recognized that subscriber access to such different telecommunications applications may be enhanced by employing, in accord with an aspect of the invention, digital messaging at the point that the subscriber accesses the telecommunications network, i.e., local access point in which, in accord with an aspect of the invention, such digital access is in the form of data packets. The format for such data packets may be, for example, the well-known asynchronous transfer mode (ATM) format, and the origination point of such packets for outgoing calls may be the subscriber's living unit.

Other aspects and features of the invention are described hereinbelow.

BRIEF DESCRIPTION OF THE DRAWINGS

In the drawing:

FIGS. 5 and 6 depict the contents of number translation tables contained within two of the RTI facilities;

DETAILED DESCRIPTION

It is noted that the following discloses an illustrative embodiment of the invention in the context of a system identified as "Routing to Intelligence" which is disclosed in my U.S. Pat. Nos. 5,390,169 and 5,392,277 respectively, issued Feb. 14 and 21, 1995, both of which are hereby incorporated by reference. It is to be understood, of course, that the following is not to be construed as a limitation, but is merely one of many different ways in which the invention may be practiced.

Figure 1:
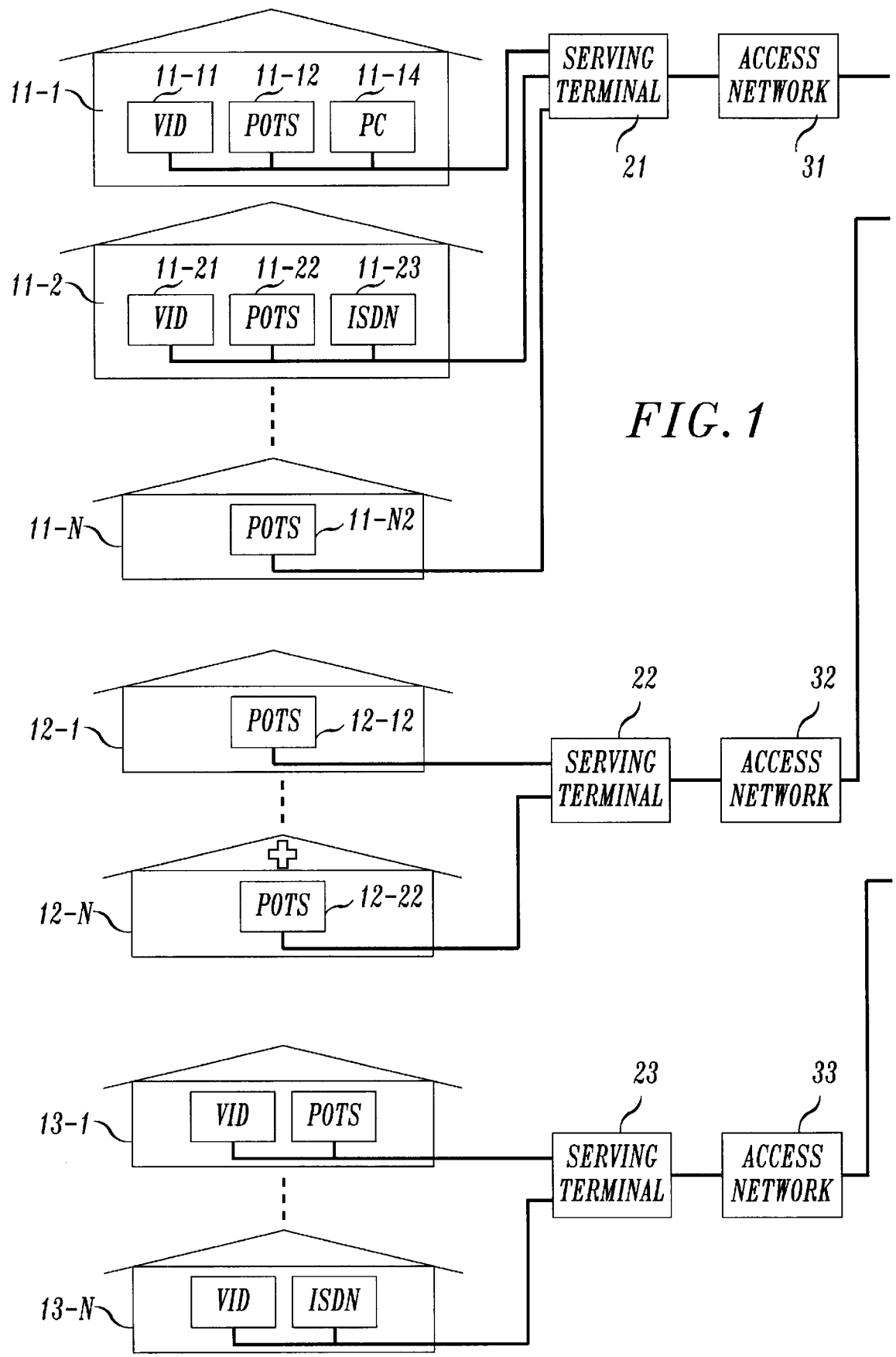
FIGS. 1 and 2, when arranged as shown in FIG. 3, comprise a block diagram of a telecommunications network embodying the principles of the invention.
Figure 2:
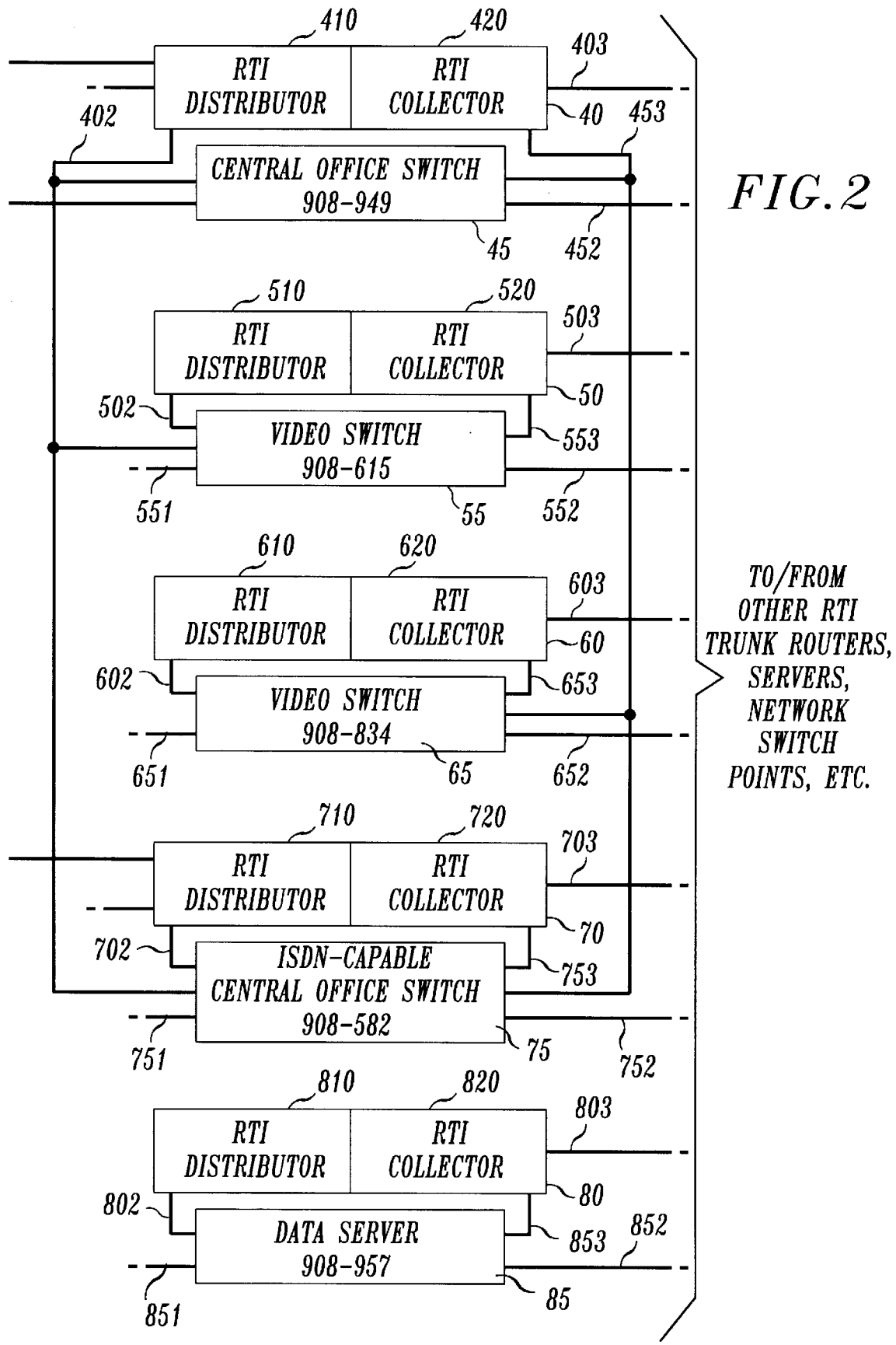
Figure 3:
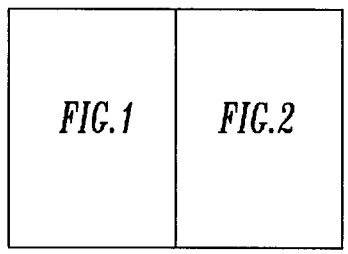

With the foregoing in mind, FIGS. 1 and 2, when arranged as shown in FIG. 3, illustrate an exemplary portion of an overall telecommunications network embodying the principles of the invention. In accordance with prior art practice, particular subscriber locations, typified by subscriber locations 12-1 through 12-N, are provided with standard, or POTS, telephony by POTS central office switch 45. The terminal devices within subscriber locations 12-1 and 12-N are conventional analog telephone sets 12-12 and 12-22 which are connected to central office switch 45 via serving terminal 22 and access network 32, which may include various cross-connected access network segments—so-called feeder pairs and distribution pairs. Alternatively, access network 32 may comprise, for example, a subscriber loop carrier (SLC) system either of a type already widely deployed throughout the telecommunications infrastructure or of the type disclosed in U.S. Pat. Nos. 5,381,405 and 5,386,417 respectively, issued on Jan. 10, 1995 and Jan. 31, 1995 to T. M. Daugherty et al, both of which are hereby incorporated by reference. Access networks 31 and 33 discussed hereinbelow are also illustratively of the type described in those patent applications.

Other subscriber locations, illustratively subscriber locations 11-1 and 11-2, have terminal devices for telecommunications applications other than just POTS. In particular, subscriber locations 11-1 and 11-2 respectively include video telecommunications terminals 11-11 and 11-21 for the video application. They also include analog telephone sets 11-12 and 11-22 for the POTS application. Subscriber location 11-1 further includes a personal computer 11-14 for data applications, while subscriber location 11-2 further includes ISDN telephone set 11-23 for the ISDN application. Although not explicitly shown in the drawing, each of the aforementioned terminal devices may be connected in parallel with other like devices—colloquially referred to as "extensions." For simplicity, however, the discussion below proceeds on the assumption that only one terminal device of any given type is present at any particular subscriber location.

Intelligent network element, or INE, servers for the various applications illustratively include central office switch 45 for the POTS application; central office switch 75 for the ISDN application; data server 85 for a data application; and video switches 55 and 65 for the video application. Each of these servers has an associated NPA-NNX, where NPA is the so-called numbering plan area, or "area code," and NNX is the so-called exchange. The directory numbers for subscriber locations supported by each server are of the form NPA-NNX-ABCD, where ABCD is a four-digit number assigned to the subscriber location in question. Illustratively, each of the INE servers shown in the drawing has the same NPA—namely 908. Starting from the top of FIG. 2, their respective exchanges are 949, 615, 834, 582 and 957.

Subscriber locations 11-1 and 11-2 could have individual access network connections to the various INE servers in order to obtain access to the various applications supported by those servers. Indeed, just as access network 32 provides direct connections from subscriber locations 12-1 through 12-N to central office switch 45, links 551, 651, 751 and 851 into line ports of INE servers 55, 65, 75 and 85 represent such direct connections from locations (not shown) served by those servers. Instead of such direct connections, however, subscriber locations 11-1 and 11-2 are provided with "routing to intelligence," or RTI.

In particular, outgoing calls from a particular one of these locations—referred to as "RTI subscriber locations"—for each of a plurality of telecommunications applications are delivered to a single point of distribution through which the subscriber location is caused to be connected, as a function of the telecommunications application type, to an appropriate one of the INE servers. To this end, the outputs of video terminal 11-11, telephone set 11-12 and personal computer 11-14 are communicated via (illustratively) individual wire pairs, or "drops," serving terminal 21, and access network 31 to a point of distribution, RTI distributor 410, within an RTI facility 40. Specifically, the outputs of those three terminal devices are packetized, in accord with an aspect of the invention, by a conventional packet assembler/disassembler, or PAD within the serving terminal, e.g., terminal 21, and it is the resulting packets that are communicated to RTI distributor 410. The outputs of video terminal 11-21 and telephone sets 11-22 and 11-23 are similarly packetized within serving terminal 21 and communicated to RTI distributor 410, again via serving terminal 21 and access network 31. In alternative embodiments, the packetization, in accord with the invention, could be implemented by PADs installed at the subscriber location, in which case a single "drop" between the subscriber location and the serving terminal may be used for communications for all of the terminal devices at that location, as will be shown below.

Subscriber location 11-N does not require RTI. Like subscriber locations 12-1 and 12-N, it subscribes only to POTS and is served by central office switch 45. However, the output of its POTS telephone set 11-N2 needs to be in packet form so as to be in conformity with the other traffic handled by serving terminal 21. To this end, the (originally analog) output of telephone set 11-N2 is also packetized, illustratively within the serving terminal. In this sense, subscriber location 11-N is treated as though it were an RTI subscriber location and is hereinafter referred to as such.

Other RTI subscriber locations (not shown) are connected to RTI distributor 410 via respective serving terminals and access networks.

RTI facility 40 is associated with central office switch 45, while further RTI facilities 50, 60, 70 and 80 are associated with video switch 55, video switch 65, central office switch 75 and data server 85, respectively, and have respective links thereto 502, 602, 702 and 802. Potentially, any of the RTI facilities could be the RTI facility to which an RTI subscriber is connected. In practical applications, however, RTI subscribers will typically be connected to an RTI facility associated with a central office switch. Thus, for example, subscriber locations 13-1 through 13-N are provided with RTI via a connection to the RTI facility associated with central office switch 75—namely RTI facility 70—via serving terminal 23 and access network 33. Reasons for having an RTI facility associated with each INE server—even the ones which do not provide direct RTI support for RTI subscribers—will become apparent as this description continues.

RTI distributor 410 has links 402 connecting to line ports of particular ones of the INE servers—namely central office switch 45, video switch 55 and central office switch 75—and it is via such links that connections are made from subscriber locations 11-1 through 11-N to those INE servers. Connections are made to others of the INE servers via their respective RTI facilities as described below.

The INE servers shown in the drawing are illustratively connected to other servers of like kind (not shown) within the network via conventional intra-lata trunks and interexchange carrier trunks 452, 552, 652, 752 and 852 which may connect to one another either directly or via intra-lata and/or interexchange carrier switch points. Additionally, RTI facilities 40, 50, 60, 70 and 80 respectively include RTI collectors 420, 520, 620, 720 and 820 pursuant to the present invention. For the present, it suffices to note that each INE server is connected from at least ones of its output, or trunk, ports to the RTI collector—serving, as will be seen, as a point of collection—within its associated RTI facility. Further, the various RTI collectors are themselves interconnected. Central office switch 45, video switch 55, video switch 65, central office switch 75 and data server 85 are each connected to the RTI collectors within their respective associated RTI facilities via links 453, 553, 653, 753 and 853, respectively. Additionally, ones of links 453 extend directly to trunk ports of at least certain of the INE servers in addition to central office switch 45—namely, video switch 65 and central office switch 75. Moreover, the RTI collectors are connected to other RTI collectors within the network via trunks 403, 503, 603, 703 and 803, respectively. Again, those trunks may be connected to one another directly or via other RTI collectors or network switch points. Additionally, individual ones of the aforementioned trunks can interconnect INE servers at one end with RTI collectors at the other. (As will be seen, communications into and out of RTI collectors are in packetized form so that any server/RTI collector interconnections would have to include appropriate packetizing/de-packetizing circuitry.) The choice of how the various trunkings are set up will depend simply on the expected levels of traffic between various points within the network; the extent to which servers already in place have or have not been provided with associated RTI facilities; etc.

Figure 4:
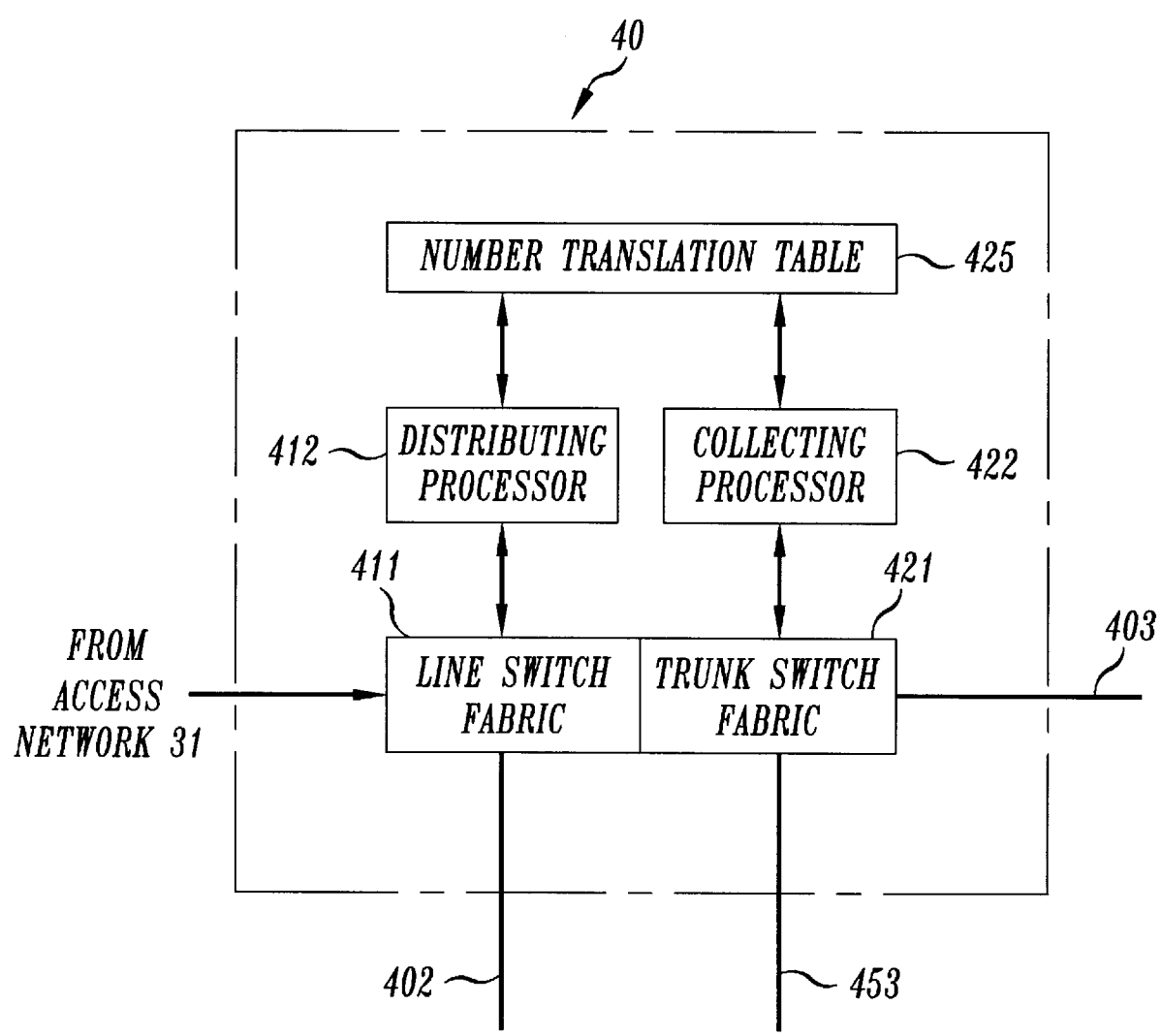
FIG. 4 is a block diagram of one of the routing to intelligence (RTI) facilities used in the network of FIGS. 1 and 2.

FIG. 4 is an illustrative realization of RTI facility 40. RTI facility 40, more particularly, includes line switch fabric 411, distributing processor 412 and number translation table 425 which are the major components of RTI distributor 410 as depicted in FIG. 2. RTI facility 40 further includes trunk switch fabric 421 and collecting processor 422 which along with, again, number translation table 425 are the major components of RTI collector 420 as depicted in FIG. 2. It is via the line and trunk switch fabrics 411 and 421 that the actual connections, in the form of virtual circuits, are made into and out of RTI distributor 410 and RTI collector 420, respectively, under the control of distributing processor 412 and collecting processor 422 which provide the intelligence to determine when and how those connections are to be set up. Number translation table 425 contains data which is used jointly by distributing processor 412 and collecting processor 422 in making those connections.

The other RTI facilities within the network are illustratively of similar design to RTI facility 40 and need not be described in further detail.

The operation of the aforementioned elements will now be described, beginning with a description of number translation table 425, the organization of which is shown conceptually in FIG. 5.

Specifically, number translation table 425 stores RTI routing information for all of the various RTI subscriber locations served by RTI facility 40, although only the information relating to RTI subscriber locations 11-1, 11-2 and 11-N is shown explicitly. Specifically, the table identifies video terminal 11-11, POTS telephone set 11-12 and personal computer 11-14 as being the terminal devices for the video, POTS and data applications, respectively, at RTI subscriber location 11-1. The designations for those terminal devices stored in table 425 correspond to the OE of the aforementioned Daugherty patents.

Table 425 further specifies an "RTI directory number" and a "server directory number" for each application. The server directory number is the directory number used internally by an INE server in the course of handling calls for a particular subscriber, that number including the server's exchange digits. Note, then, that the server directory numbers for video, POTS and data applications for subscriber location 11-1 are 908-615, 908-949 and 908-957 directory numbers, respectively, which are the NPA-NNX's of INE servers 55, 45 and 85. The server directory number is relevant to such issues as billing and other telephony administration matters.

The RTI directory number, on the other hand, is the directory number used externally in, for example, directing calls to a particular subscriber location. In accordance with the present invention, incoming calls of various application types can be directed to a single directory number, thereby causing them to be delivered to a single point of collection—an RTI collector—associated with a portion of that dialed directory number. That portion of dialed directory number is illustratively the six digits comprising its numbering plan area (or "area code") and exchange. Connections for those calls are thereupon caused to be made from the point of collection to an appropriate INE server, as a function of the telecommunications application type and the directory number in question. Thus as can be seen from FIG. 5, the RTI directory number for all three applications subscribed to from subscriber location 11-1 is the same—908-949-6111—so that, advantageously, calls of all three application types intended for subscriber location 11-1 can be directed to the same directory number.

The column headed "ROUTE TO/OUTGOING" indicates how an outgoing call of each of the application types is to be routed. As noted above, particular ones of links 402 connect RTI distributor 410 directly into line ports of not only its associated INE server—POTS central office switch 45—but also of video switch 55 and ISDN central office switch 75. These have been provisioned because, in this example, there is a sufficient amount of traffic between RTI subscriber locations served by RTI facility 40, on the one hand, and those particular INE servers, on the other hand, to warrant the provisioning and ongoing maintenance of such links. By contrast, there is insufficient traffic between those locations and video switch 65 or data server 85 to warrant a specific link between them. In that situation, outgoing calls are routed via trunks 403 to the RTI facilities 60 and 80 associated with those servers—this being a more economical approach because those trunks can be used to connect RTI facility 40 to a whole multiplicity of other RTI facilities. Thus, as shown in FIG. 5, the ROUTE TO/OUTGOING entries within table 425 for subscriber location 11-1 identify switches 45 and 55 as the entities to which outgoing POTS and video calls are to be routed, while RTI collector 820 of RTI facility 80 is specified as the entity to which outgoing data calls—which are to be served by its associated INE server, data server 85—are routed.

RTI subscriber location 11-2 has two RTI directory numbers. Specifically, the directory number 908-949-7222 is used for its video and POTS applications in accordance with the invention, the video and POTS INE servers being video switch 65 and POTS central office switch 45, respectively. On the other hand, the directory number for the ISDN application for this subscriber location is a directory number supported by central office switch 75—the directory number 908-582-7678—rather than a directory number supported by central office switch 45. Such an arrangement, which is conventionally referred to as "foreign exchange" service, is provisioned at the subscriber's request. For example, the subscriber may have been using the 908-582-7678 number for an extended period of time in the past and may wish to continue to receive ISDN calls at that number even though other calls are received at the 908-949-7222 number. Inasmuch as RTI distributor 410 has direct links 402 to central office switches 45 and 75, it is those servers that are listed in the ROUTE TO/OUTGOING column for location 11-2. There is no such link to video switch 65. Accordingly, that column has RTI collector 620 listed.

Table 425 also shows that the POTS application for telephone set 11-N2 at subscriber location 11-N has the directory number 908-949-8333 and is supported by central office switch 45. Number translation table 425 also has a column headed "ROUTE TO/INCOMING." The entries in this column indicate how incoming calls are to be routed. In particular, all incoming non-POTS calls directed to a 908-949 RTI directory number will be delivered, in the first instance, to RTI collector 420 via trunks 403 and, depending on the trunking from the originating location, some of the POTS calls will be directed thereto, as well. (The non-RTI POTS calls will be delivered to central office switch 45 directly via one of trunks 452 in the conventional way.) As shown in FIG. 5, POTS and video calls received at RTI collector 420 for the RTI directory numbers 908-949-6111 and 908-949-8333 are routed to central office switch 45, that routing being by way of respective ones of links 453. Video and data calls for that RTI directory number are routed to RTI collectors 520 and 820 since there are no direct links from RTI distributor 420 to video switch 55 or to data server 85.

With respect to incoming calls to RTI directory number 908-949-7222, incoming video and POTS calls are routed, via direct connections, to video switch 65 and central office switch 45.

Incoming calls to 908-582-7678 are not received by RTI facility 40 and, therefore, there is no ROUTE TO/INCOMING entry for that number.

Each RTI facility within the network has its own number translation table similar to table 425. For present illustrative purposes, it is useful to depict, as shown in FIG. 6, a particular one entry of the number translation table within RTI facility 70, that being the entry associated with ISDN telephone set 11-23. For the most part, a number translation table includes entries for locations which are directly connected to the RTI facility in question, such as subscriber locations 13-1 through 13-N in the case of RTI facility 70. However, since the directory number for telephone set 11-23 is a directory number supported by central office switch 75, i.e., a directory number whose NPA-NNX is 908-582, it is necessary for the table of FIG. 6 to include such an entry as well so that incoming calls to 908-582-7628 can be routed appropriately. Outgoing calls from telephone set 11-23 are not handled by RTI facility 70 and, therefore, there is no ROUTE TO/OUTGOING entry for that number.

A further column in the number translation tables is headed "WIRETAP?". The presence of a directory number in this column indicates that a law enforcement agency has obtained a court order authorizing a wire tap for the directory number in question. In the event that either an incoming (outgoing) call is made from (to) such a directory number, the RTI facility will initiate a call to the number specified in the WIRETAP? column—which number terminates at a law enforcement agency's wiretap facility—and will supply the "tapped" conversations over the call thus initiated. FIG. 5 shows that telephone set 11-N2 is currently under a wiretap order, with the communications to and from its directory number being "tapped" and supplied to 908-555-8282. If desired, such wiretapping can be effected for applications other than POTS, e.g., video.

The column headed "FX" (foreign exchange) is explained at a more opportune point hereinbelow.

Particular mention should be made at this point of data server 85. Its inclusion in a network of the type shown in FIGS. 1–2 is wholly optional. Indeed, data server 85 is envisioned by me to be a new kind of server which would serve as a) a network endpoint providing any various information database or other data services to a caller combined with b) a set of telephony-server-type functionalities, such as billing, so that a subscriber location can connect into such a server via any of the mechanisms described above without having had to have been connected through any other INE server, such as a central office switch. An INE server of this type might be referred to as an application server, as compared with a telephony server which is what each of the other INE servers shown in the drawing are.

Figure 8:
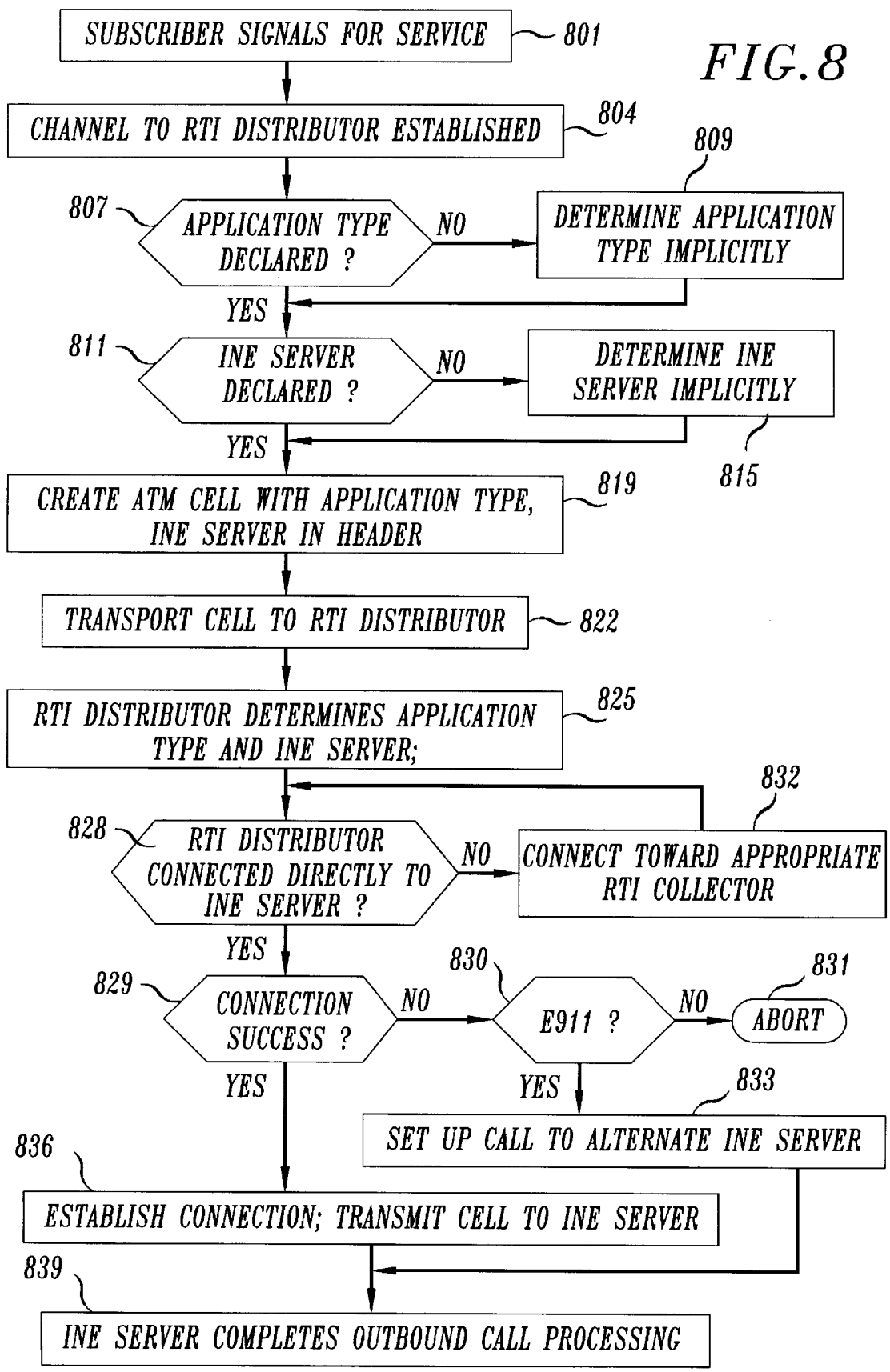
FIG. 8 is a simplified flowchart of the outgoing call processing carried out by the network of FIGS. 1 and 2 in accordance with the invention.

Referring to the flowchart of FIG. 8, consider now the origination of an outgoing call from, for example, RTI subscriber location 11-1. As shown at block 801, the subscriber signals for service by, for example, taking a telephone set off hook or otherwise causing a terminal device to transmit to the serving terminal a signal requesting service. Serving terminal 21 thereupon initiates the setting up of a communications channel between the telephone set and RTI distributor 410 via access network 31 in the manner described in the above-cited Daugherty patents (block 804). At the same time, serving terminal 21 determines the application type. On the one hand, the application type may be declared explicitly (block 807). For example, the application type might be declared in a terminal-device-to-serving-terminal message generated automatically by the terminal device. Or the application type might be declared by the subscriber—for example, in response to a prompt supplied by the serving terminal. If, on the other hand, the application is not declared explicitly, it is determined implicitly (block 809). Specifically, the application type may be implicit in the type of terminal device requesting service, e.g., a POTS telephone set, or may simply be determined, by default, to be a particular application type, e.g., POTS.

The serving terminal also determines, if it can, the INE server that is to serve the call. More particularly, the INE server that is to serve the call may be explicitly declared (block 811) via one of the mechanisms noted above in connection with the application type or it may be determined implicitly (block 815). The implicit determination may be, for example, as a consequence of a pre-specification, within the serving terminal, of the INE server for the application type in question. Failing any of the foregoing, the INE server is determined by RTI distributor 410 from number translation table 425, as described below.

Figure 7:
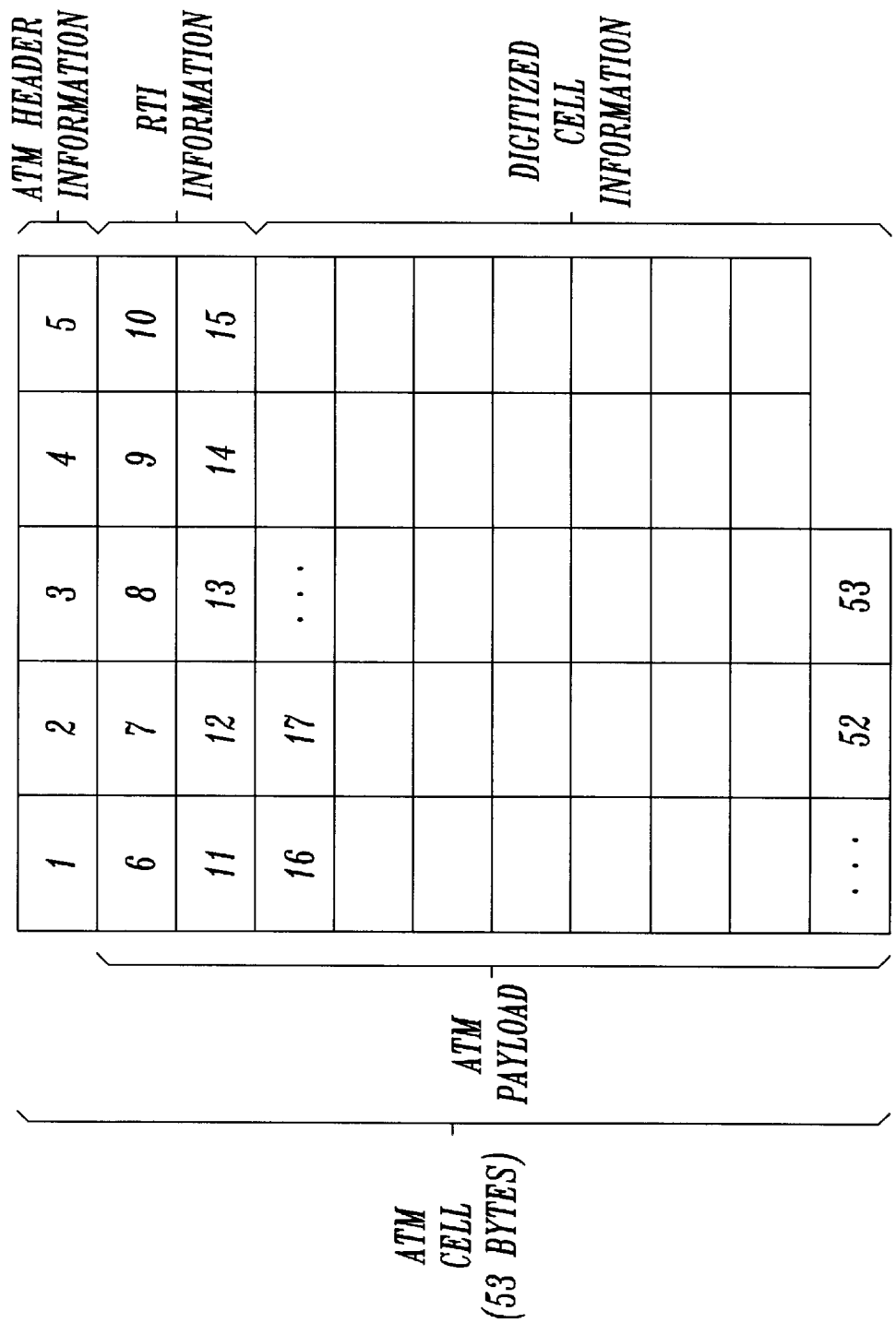
FIG. 7 shows the format of ATM cells communicated within the network of FIGS. 1 and 2.

The serving terminal then creates a data packet (block 420), the structure of which is shown in FIG. 7. The packet illustratively conforms to the standard 53-byte ATM cell envelope format, although any cell design can be used. Specifically, the first five bytes comprise standard ATM header information. The remainder of the 53 bytes contains the cell "payload" beginning with such RTI information as the application type, the INE server, if known, and the terminal device identification, OE.

The cell is then transmitted over access network 31 to RTI distributor 410 (block 822), which thereupon determines the application type and/or the INE server (block 825). As just seen, one or both of these may have been specified in the cell itself. If the application type has not been so specified, a default application type is assumed, e.g., POTS. If an INE server is not specified in the cell, the ROUTE TO/OUTGOING column of number translation table 425 is consulted to determine where the call is to be routed. If number translation table 425 does not contain, for the subscriber location in question, an entry for the application type in question, a default INE server, e.g. central office switch 45, is assumed. This means that, advantageously, it is not mandatory that an entry be made in table 425 for every application type, for every subscriber location, connected to an RTI serving terminal, such as serving terminal 21. As an example, the entries shown in table 425 for one or both of POTS telephone sets 11-12 and 11-N2 could be eliminated, with the result that POTS calls received therefrom would be routed to, for example, central office switch 45 as the default.

Assume that the call is to be connected to an INE server that is directly connected to RTI distributor 410 via one of links 402 (block 828), such as central office switch 75. In this case, distributing processor 412 a) instructs line switch fabric 411 to establish a virtual circuit connecting the incoming channel to an appropriate channel on one of those links 402 and, b) using ATM commands, causes the ATM cell to be transmitted to the INE server over that link (block 836). This assumes (block 829) that the network was, in fact, successful in making the connection (block 829) rather than being unable to do so as the result of equipment problems, cable cuts or the like. It also assumes that the INE server is ATM-compatible. If it is not, an applique or interface (not shown) is provided at the INE server which serves as a "front end" to depacketize the cell and to present the information content thereof in the form expected by the INE server and to perform the opposite function for information directed back to the terminal device.

On the other hand, there may be no direct link from the RTI distributor to the INE server, as is the situation in the case of video switch 65. In that situation (block 832), a connection toward RTI collector 620 is made by having line switch fabric 411 establish a virtual circuit connecting the incoming channel out onto one of trunks 403 via trunk switch fabric 421. The term "toward" is used here to denote the fact that the ultimate connection between RTI collectors 420 and 620 may, itself, be not a direct trunk connection but, rather, involve one or more intermediate RTI collectors. Thus as shown in FIG. 8, the output of block 832 loops back through block 828 until the call has reached the RTI collector (in this example, 620) of an RTI facility (60) whose RTI distributor (610) is directly connected to a line port of the desired INE server (65), per block 828. Such routing through any intermediate RTI collectors would be effectuated within those collectors using conventional numbering plan concepts wherein each such collector would have information about which outgoing trunk ought to be used to forward a call to any particular destination specified. And as before, the connection from the RTI distributor to the INE server is made, assuming that there are no impediments to same (blocks 829 and 836) and, also as before, the cell is transmitted to the INE server.

It is thus seen that through either of the two mechanisms—direct connection from the RTI distributor to the INE server, or trunk connections via the RTI collectors and, ultimately, an RTI distributor—a complete connection is established between the terminal device at the subscriber location and the appropriate INE server. With this first, service-requesting cell having been communicated to the appropriate RTI server and a connection having been established between the calling terminal device and the INE server, the latter is now in a position to complete outbound call processing (block 839) in any of a number of ways. If the called party is served by that same INE server, the call can be completed either in the conventional way, if the called party is not an RTI subscriber, or via the process set forth in FIG. 9 beginning from block 931 if the called party is an RTI subscriber. If the called party is not served by the same INE server, the call is routed over a respective one of outgoing trunks 452, 552, etc., or via a respective one of RTI collectors 420, 520, etc., those options having been described hereinabove. In the latter case, a channel is set up between the INE server and the RTI collector via one of links 453, 553, etc., the vehicle by which this is done again being ATM commands. It may also be noted that the called "party" may, in actuality, simply be an INE application server somewhere in the network—as opposed to a telephony server—a typical scenario being a call from a subscriber to a server which supplies video on demand. In that case, the outgoing call might be a POTS or ISDN call during which the desired video program is ordered by the caller, and which call is thereafter terminated, followed by an automatic video call back to the subscriber location initiated from the application server.

It may be the case—contrary to what is assumed above—that due to equipment failures, cable cuts, etc., the network is not able to establish a connection from a subscriber location to the desired INE server. This is the "NO" branch leading from block 829. If this is the case, and if the call is a so-called E911 (or other emergency) call, it is desirable to make alternate arrangements. In that case, then, the system invokes what I call a survivability feature as characterized by the table 425 entry associated with ISDN telephone set 11-23 and includes an entry in the column headed "E911 SERVER", as disclosed in my aforementioned patents.

That is, in preferred embodiments, the RTI distributor will "camp on" to all calls routed through it, thereby being able to, for example, recognize that an ongoing emergency call has been disrupted and thereupon provide for alternate routing of the call.

Figure 9:
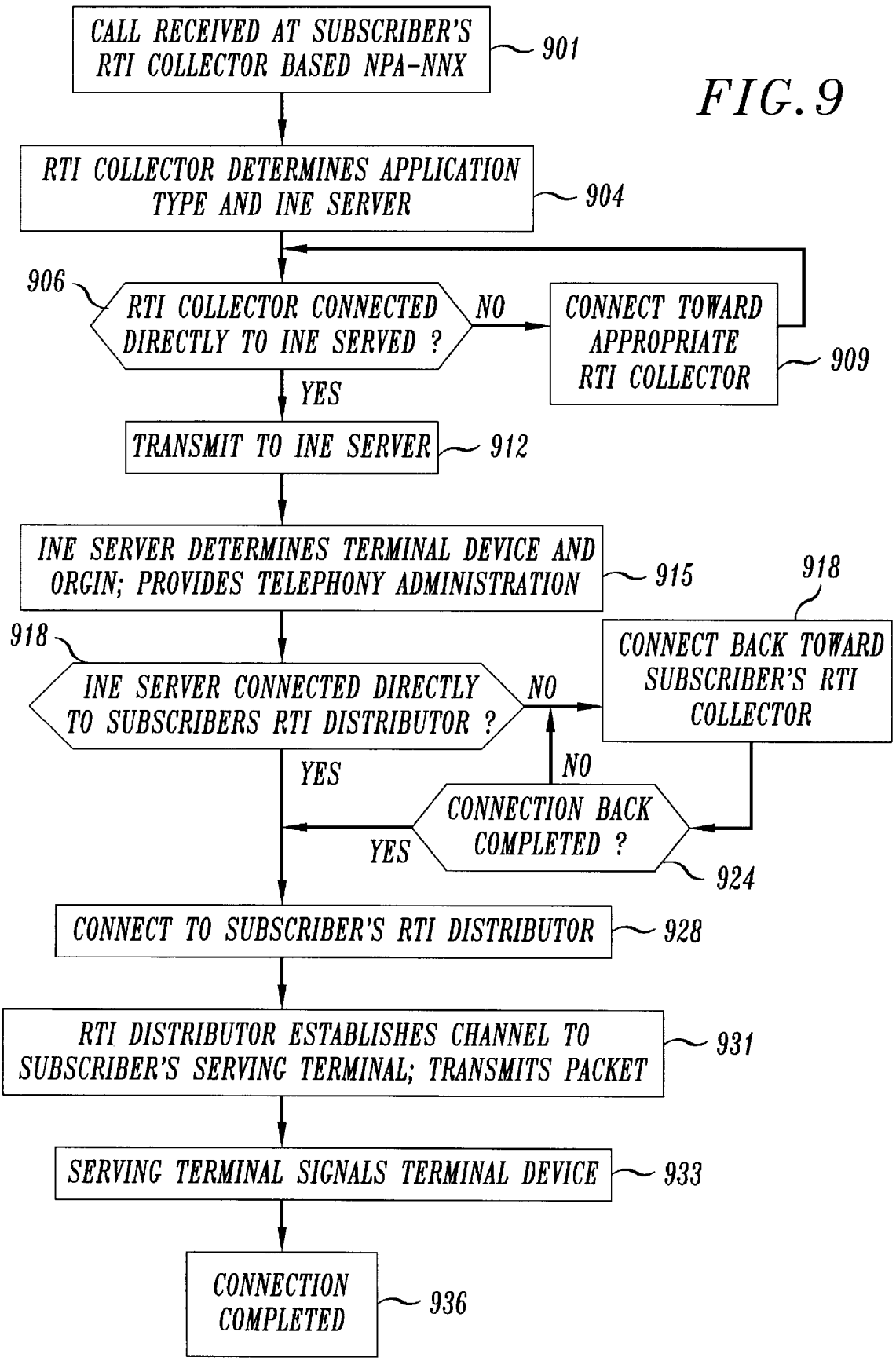
FIG. 9 is a simplified flowchart of the incoming call processing carried out by the network of FIGS. 1 and 2 in accordance with the invention.

Referring to the flowchart of FIG. 9, consider now the receipt of an incoming call to, for example, RTI subscriber location 11-1. All RTI calls directed to a particular directory telephone number are received at the RTI collector associated with the NPA-NNX of that number (block 901) in accordance with the principles of the invention.

In this case, it is assumed that the incoming call is an RTI call intended for 908-949-6111, so that the call is received by RTI collector 420. (Again, non-RTI calls to 908-949 numbers are received by central office switch 45 via trunks 452 in the conventional way.) Collecting processor 422 thereupon determines the application type and the appropriate INE server (block 904) either by reference to data contained in the incoming cell, to the extent that such data is provided, or from number translation table 425.

If RTI collector 420 is directly connected to the trunk side of the INE server—as is the case if the server is central office switch 45, video switch 65 or ISDN central office switch 75—collecting processor 422 a) instructs trunk switch fabric 412 to establish a virtual circuit connecting the trunk channel on which the call is being received to an appropriate channel on one of links 453 and, b) using ATM commands, causes the call to be transmitted to the INE server over that link (block 912). On the other hand, there may be no direct connection on the trunk side to the INE server. Thus assume, for example, that the INE server that is to serve the call is video switch 55, for which there is, indeed, no such connection. In this situation, collecting processor 422 a) instructs trunk switch fabric 412 to establish a virtual circuit connecting the trunk channel on which the call is being received back out on another trunk channel toward RTI collector 520 (block 909), either via a direct trunk connection or via one or more intermediate RTI collectors until the call reaches RTI collector 520 (block 906) which (again, at block 912) instructs its own trunk switch fabric (not shown) to a) establish a virtual circuit connecting the incoming channel on one of trunks 503 to a channel on one of links 553, and b) using ATM commands, cause the call to be transmitted to video switch 55. The INE server that has now received the incoming call identifies from the incoming call data such information as the origin of the call, i.e., the originating directory number, which is used for a number of purposes, such as billing and calling number delivery service; the identity of the immediately prior entity which forwarded the call, as is conventional in packet switching technology generally; and the called directory number. The INE server thereupon provides conventional telephony administration such as determining whether the called directory number is currently "busy," "idle," "ringing," etc. (block 915). If the called terminal device is, in fact, available to receive the call, steps are taken to complete a connection thereto.

In particular, assume that the INE server that is handling the call is central office switch 45. Since the INE server in that case is, in fact, connected directly to the subscriber's RTI distributor 410 via links 402 (block 918), central office switch 45 initiates the setting up of a channel over one of those links to the RTI distributor (block 928)—specifying the called terminal identification—its $OE_i$—of the aforementioned Daugherty patents. The fact that there is no entry in the FX column of number translation table 425 for the terminal devices whose RTI directory number is 908-949-6111—the assumed called number—implicitly means that such devices are connected to the RTI distributor of which that table is a part, namely RTI distributor 410. (The counter example is treated below.) Moreover, the OE includes information which specifies serving terminal 21 as the one to which those terminal devices are connected. RTI distributor 410 can thus simply proceed to a) establish a channel over access network 31 to serving terminal 21 and then transmit the call thereto (block 931). Serving terminal 21 thereupon signals the terminal device, e.g., by activating its ringer (block 933). The connection is completed upon the subscriber answering the call (block 936) and communication between the calling and called parties can proceed.

On the other hand, the INE server that is handling the call may not be directly connected to RTI distributor 410. Thus assume, for example, that the INE server that is serving the incoming call is video switch 65, for which there is, indeed, no such direct connection. In this situation, connections are made back out through to RTI collector 620 via appropriate trunks and, possibly, intermediate RTI collectors (blocks 922 and 924) until a connection to RTI collector 420 has been made, and then processing continues as before, beginning at block 928.

Consider, now, the FX column of the number translation table of RTI facility 70 as shown in FIG. 6. The fact that there is an entry in that column for ISDN telephone set 11-23 means that that telephone is not directly connected to the RTI distributor of which that table is a part. That is, it is not connected to RTI distributor 710. Thus, in contradistinction to the example given earlier, central office switch 75 should not forward incoming calls for telephone set 11-23 to its own associated RTI distributor. Rather, it should forward them to the RTI distributor to which the subscriber location in question is, in fact, connected. This is readily accomplished by having RTI collector 720 specify to central office switch 75, when a call first comes in, how the call should be routed out the line side of that switch. In the example shown in FIGS. 1–2, the FX entry for ISDN telephone set 11-23 is "DIST 41 O/D", indicating to central office switch 75 that it has a direct link (as denoted by the "/D") to the called subscriber location and that it should route incoming calls for telephone set 11-23 over its link 402 to RTI distributor 410. The latter then proceeds to complete the connection in the manner described above.

If there were to be no direct connection between central office switch 75 and RTI distributor, then the entry in the FX column for telephone set 11-23 would simply be "DIST 410." That lack of the "/D" notation in the entry means that RTI distributor 710, upon receiving the call, consulting the number translation table of FIG. 6 and forwarding the call on to central office switch 75, would instruct central office switch 75 to route the call to its own RTI distributor 710 identifying RTI distributor 410 as the destination. RTI distributor 710 will thereupon cause the call to be routed to RTI distributor 410 via RTI collectors 720 and 420. It will be appreciated that this technique for implementing a foreign exchange feature can be used to provide that feature over great geographic distances without the need for long, and therefore expensive, dedicated connections, as is the case today. Advantageously, then, a subscriber can continue to utilize a particular directory telephone number even while continuing to physically re-locate him/herself over time. For this reason, this aspect of the operation of the network of FIGS. 1–2 can be thought of as a "number portability" feature.

Figure 10:
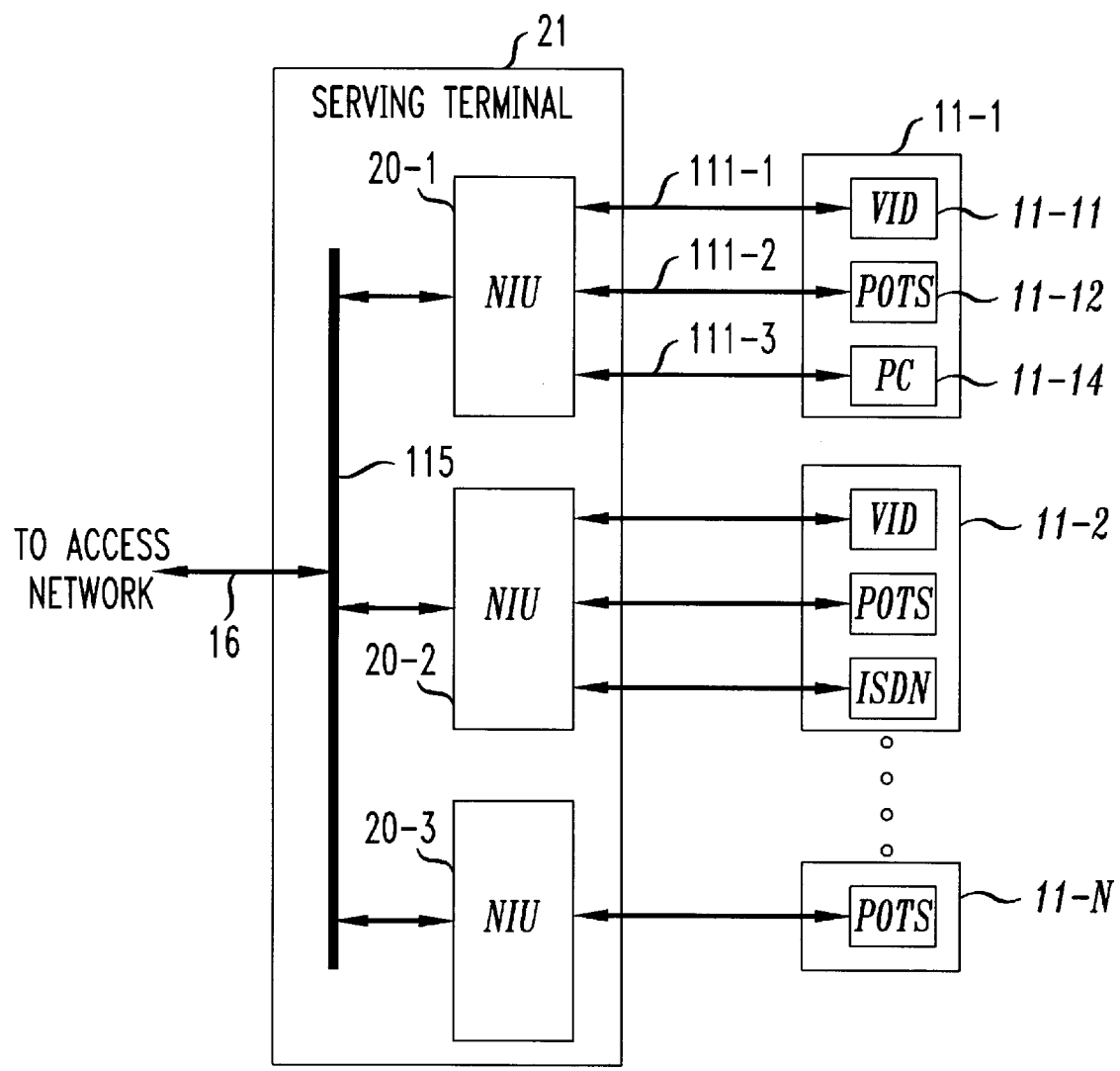
FIG. 10 is a simplified block diagram of a serving terminal of FIG. 1.

Turning now to FIG. 10, it is seen that a serving terminal, e.g., serving terminal 21, includes a plurality of Network Interface Units (NIU) 20-1 through 20-n associated with respective subscriber locations. An NIU 20$i$, more particularly, provides an interface between a telephone station or data terminal (e.g., PC 11-4) and communications path 16 extending to the associated access network, e.g., network 31. For example, as discussed above, assume that the subscriber at location 11-1 originates an outgoing call by taking telephone set 11-12 off hook or otherwise causing a terminal device 11-14 to transmit to the serving terminal a signal requesting service. NIU 20-1 serving subscriber location 11-1 "sets up" a communications channel on communication path 16 which extends to associated access network 31. Access network 31 interfaces with the NIUs via conventional data network 115. At the same time, NIU 20-1 determines the application type associated with the calling station, as discussed above in conjunction with FIG. 8. The NIU also identifies (in the manner discussed above) the INE server that is to serve the call.

NIU 20-1 then creates one or more data packets to transmit via the associated access terminal 31 (a) the application type associated with the calling station (or a default application), (b) identity of the INE server for that application, (c) calling terminal $OE_i$ and (d) calling telephone number. Access terminal 31, in turn, transmits the packet(s) to RTI distributor 410, as mentioned above.

Figure 11:
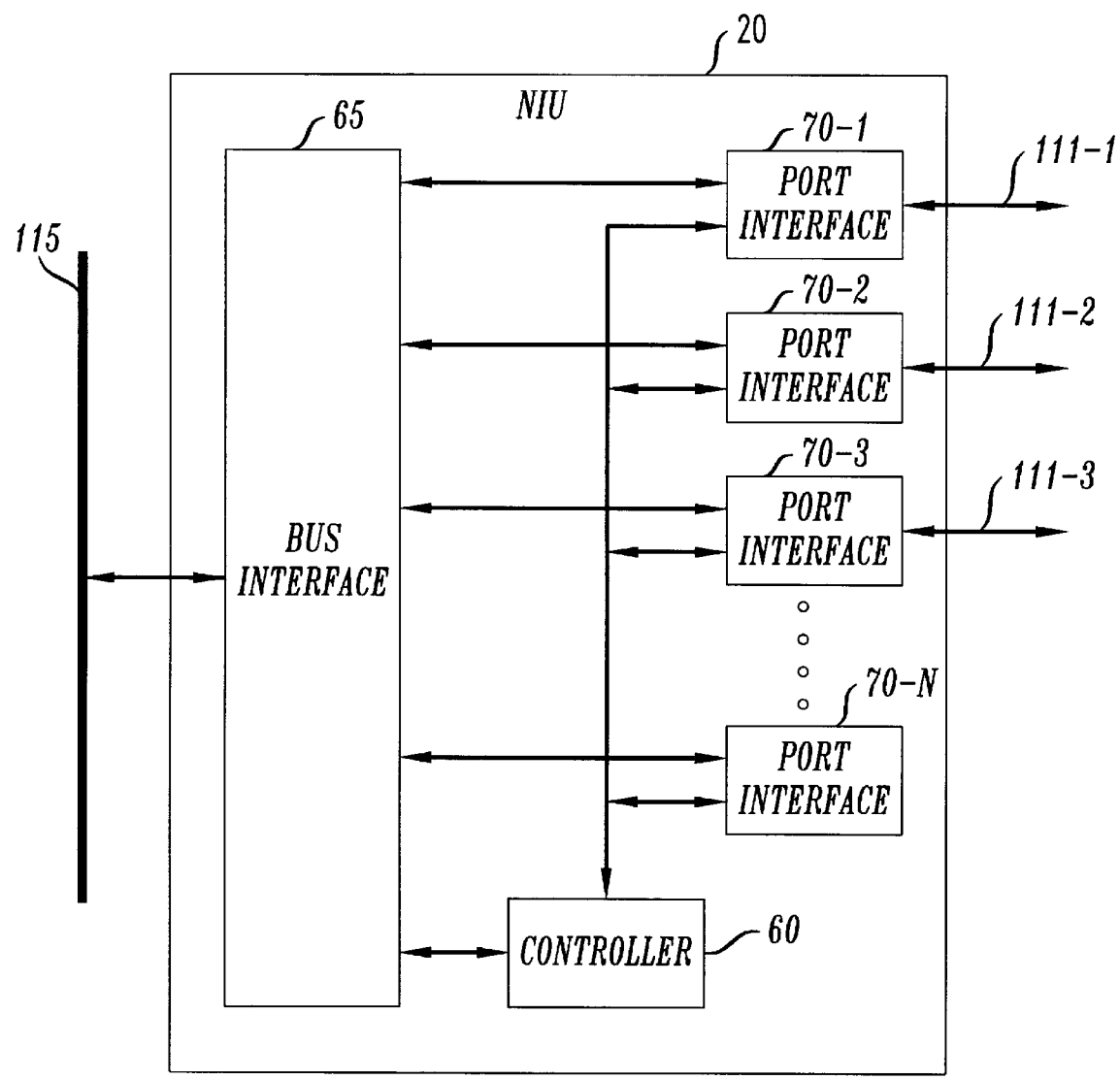
FIG. 11 is a block diagram of a Network Interface Unit (NIU) of FIG. 10.

FIG. 11 is a broad block diagram of an NIU 20$i$, which includes bus controller 60, interface 65 and a plurality of port interface circuits 70-1 through 70-N for interfacing an NIU with respective telephone equipments. As mentioned above, a telephone subscriber may be associated with different telephone equipments, e.g., video telephone, voice telephone, computer terminal etc., each of which may be connected to a respective NIU port interface. Controller 60, more particularly, communicates with the associated access system via a control channel (time slot) of bus 115. Such communications include information relating to an incoming call from the access system and information identifying the bus 115 channel (time slot) assigned to the call and the recipient ($OE_i$) of the call. Controller 60, in turn, translates the $Oe_i$ into the identity of a port 70, e.g., port 70-1, and passes the identity of the time slot carrying the call and identity of the latter port to bus interface circuit 65. Thereafter, interface circuit 65 reads a data packet (information) from bus 115 during the identified time slot and passes the packet to the identified port 70. The identified port 70 then disassembles the packet and supplies the payload to the telephone device that it is serving. If the latter device happens to be a POTS then the port converts the data forming the payload into analog signals and supplies the result to the POTS. Thereafter, the port packetizes signals that it receives from the telephone device and supplies each such packet to bus interface circuit, which then transmits the packet to the associated access network via path 115 during the assigned time slot. As mentioned above, the port disassembles ("depacketizes") packets that it receives from bus interface and presents the payload to the telephone device that the port serves.

In the opposite direction, a port 70 recognizes an off-hook condition initiated by a subscriber connected thereto and sends an indication thereof to controller 60. Controller 60, in turn, creates a data packet as described above and supplies the packet(s) to the associated access terminal for delivery to the appropriate RTI. (It is noted that the packet may also contain the identity of the port circuit reporting the off-hook.) The access network also assigns a bus 115 channel (time slot) to the call and passes the assignment to controller 60. The access network also assigns a channel of the path connected to the appropriate RTI in order to establish a connection between the calling and called telephone devices.

When either end of the call "hangs up" then that event is communicated to controller 60 which then terminates the call by notifying its associated interface 65 to terminate its reading of bus 115 during the time slot assigned to the call. The call is terminated in a similar manner at the associated access network.

The foregoing merely illustrates the principles of the present invention, as the following list of some of the possible alternatives and variations demonstrates:

Although the invention is disclosed herein in the context of the North American numbering plan, it is equally applicable to any telecommunications numbering plan.

Although the various INE servers in the network are each shown as having a respective different associated RTI facility, a single RTI facility can be arranged to be associated with two or more INE servers, just as, today, multiple servers are often supported in a single so-called wire center.

Although serving terminals for residences and small businesses are typically installed in an outdoor pedestal or on a utility pole, the serving terminals shown and described herein could, alternatively, be installed within the subscriber location itself—such as in a basement—so that, in effect, the subscriber terminal provides local area network (LAN) functionality within the subscriber premises.

Additionally, the network of FIGS. 1 and 2 could be arranged to have an embedded network management capability in which diagnostics, testing and performance monitoring could be designed into the various elements of the network and the ATM capabilities available in the network could be used to route all that data to a central telemetry facility.

It will thus be appreciated that, although the invention is illustrated herein in the context of a specific illustrative embodiment, those skilled in the art will be able to devise numerous alternative arrangements which, although not explicitly shown or described herein, embody the principles of the invention and are within its spirit and scope.

I claim:

1. A method of interfacing a conventional telephone station device located within a living unit with a telecommunications system comprising the steps of co-locating a network interface unit and said conventional telephone station device within a living such that the network interface unit is connected between said telephone station device and said telecommunications system, at said network interface unit, responsive to receiving a signal indicative of a request to place a telephone call from said telephone station device, forming a data packet containing said request and transmitting said packet to an access network over a data network, associating said call with a data channel, and thereafter forming intelligence received from said calling telephone station device into respective data packets and transmitting said data packets as they are formed over said data network to said access network for forwarding to a called station.

2. The method of claim 1 further comprising the steps of receiving from said telecommunications system data packets destined for said telephone station device and converting intelligence contained in said received packets to a form acceptable to said telephone station device, and supplying said converted intelligence to said telephone station device.

3. The method of claim 1 wherein said telecommunications system supports a plurality of different telecommunications application types including POTS, video, and data and wherein said method further comprises the steps of associating said telephone station device with one of said application types and including in said data packet containing said request said one of said application types.

4. The method of claim 1 wherein said data packets conform to an asynchronous transfer mode format.

5. A method of operating a local loop connecting a conventional telephone station device located in a living unit to a telecommunications system comprising the steps of connecting the telephone station device to the local loop via a network interface unit co-located with the telephone station device within a living unit, at the network interface unit, responsive to receipt of a request from said telephone station device to place a telephone call, encoding at least said request in a data packet and transmitting said data packet over said local loop to said telecommunications system, and encoding signals received after said call has been established into respective data packets and transmitting said data packets to said telecommunications system as they are formed.

6. The method of claim 5 further comprising the step of associating said telephone call with a data channel and performing said transmission of said data packets during respective ones of said data channels.

7. The method of claim 5 further comprising the steps of receiving from said telecommunications system data packets destined for said telephone station device and converting intelligence contained in said received packets to a form acceptable to said telephone station device, and supplying said converted intelligence to said telephone station device.

8. The method of claim 5 wherein said telecommunications system supports a plurality of different telecommunications application types including POTS, video, and data and wherein said method further comprises the steps of associating said telephone station device with one of said application types and including in said data packet containing said request said one of said application types.

9. The method of claim 5 wherein said data packets conform to an asynchronous transfer mode format.

10. The method of claim 5 further comprising the step of encoding intelligence received from said telephone station device after said request into one or more data packets and transmitting said one or more data packets to said telecommunications system.

* * * * *